(12) United States Patent
Kawasaki

(10) Patent No.: US 11,524,917 B2
(45) Date of Patent: Dec. 13, 2022

(54) MULTIPLE TUBE BURNER FOR SYNTHESIZING POROUS MATERIAL AND APPARATUS FOR SYNTHESIZING POROUS MATERIAL

(71) Applicant: FURUKAWA ELECTRIC CO., LTD., Tokyo (JP)

(72) Inventor: Mitsuhiro Kawasaki, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 154 days.

(21) Appl. No.: 16/540,174

(22) Filed: Aug. 14, 2019

(65) Prior Publication Data

US 2019/0375671 A1    Dec. 12, 2019

Related U.S. Application Data

(63) Continuation of application No. PCT/JP2018/001747, filed on Jan. 22, 2018.

(30) Foreign Application Priority Data

Feb. 22, 2017    (JP) .............................. JP2017-030632

(51) Int. Cl.
*C03B 37/018*    (2006.01)
(52) U.S. Cl.
CPC ........ *C03B 37/018* (2013.01); *C03B 2207/20* (2013.01); *C03B 2207/42* (2013.01); *C03B 2207/66* (2013.01)
(58) Field of Classification Search
None
See application file for complete search history.

(56) References Cited

U.S. PATENT DOCUMENTS

| 4,199,337 A | 4/1980 | Asam |
| 5,788,730 A | 8/1998 | Ruppert et al. |
| 6,079,225 A | 6/2000 | Ruppert et al. |

(Continued)

FOREIGN PATENT DOCUMENTS

| CN | 1807302 A | 7/2006 |
| CN | 102234177 A | 11/2011 |

(Continued)

OTHER PUBLICATIONS

JP-5513949U EPO Machine Translation of the claims performed Mar. 4, 2022. (Year: 2022).*

(Continued)

*Primary Examiner* — Lisa L Herring
(74) *Attorney, Agent, or Firm* — Oblon, McClelland, Maier & Neustadt, L.L.P.

(57) ABSTRACT

A multiple tube burner for synthesizing a porous material includes three or more glass tubes are arranged coaxially with one another, the glass tubes having a substantially circular shape on a cross section perpendicular to a longitudinal direction. Out of the three or more glass tubes, a first glass tube and a second glass tube that is arranged on an outer side of the first glass tube are connected with each other on a gas introducing side, and a thickness near a joint portion of the second glass tube connected with the first glass tube is thicker than a thickness of the second glass tube on the gas spouting side.

4 Claims, 3 Drawing Sheets

(56) References Cited

U.S. PATENT DOCUMENTS

| | | | |
|---|---|---|---|
| 2002/0104332 A1* | 8/2002 | Ruppert | C03B 19/1423 65/421 |
| 2005/0016218 A1* | 1/2005 | Ishihara | C03B 37/0142 427/166 |
| 2006/0137404 A1* | 6/2006 | Nunome | C03B 37/01413 65/421 |
| 2010/0323311 A1 | 12/2010 | Yashida | |
| 2011/0259055 A1* | 10/2011 | Yoshida | C03B 37/0142 65/416 |
| 2014/0050450 A1* | 2/2014 | Orita | C03B 37/0146 385/123 |

FOREIGN PATENT DOCUMENTS

| | | | |
|---|---|---|---|
| CN | 102583997 A | 7/2012 | |
| JP | 55-13949 | 1/1980 | |
| JP | 61-236625 A | 10/1986 | |
| JP | 9-100128 A | 4/1997 | |
| JP | 9-100133 A | 4/1997 | |
| JP | 10-095623 A | 4/1998 | |
| JP | 11-49522 A | 2/1999 | |
| JP | 2000-327341 A | 11/2000 | |
| JP | 2003-212560 A | 7/2003 | |
| JP | 2003-246627 A | 9/2003 | |
| JP | 2010-215415 A | 9/2010 | |
| JP | 2010-280549 A | 12/2010 | |
| JP | 2010280549 A * | 12/2010 | C03B 37/0142 |

OTHER PUBLICATIONS

Japanese Office Action dated Jul. 21, 2020 in Japanese Patent Application No. 2017-030632 (with unedited computer generated English translation), citing documents AO through AS therin, 10 pages.

Extended European Search Report dated Nov. 5, 2020 in European Patent Application No. 18757148.4, 6 pages.

Combined Chinese Office Action and Search Report dated Mar. 17, 2021 in Chinese Patent Application No. 201880010249.7 (with English translation), citing documents AA and AO-AQ therein, 13 pages International Search Report dated Apr. 24, 2018 in PCT/JP2018/001747 filed Jan. 22, 2018 (with English Translation).

Written Opinion dated Apr. 24, 2018 in PCT/JP2018/001747 filed Jan. 22, 2018.

Office Action dated Dec. 3, 2021 in Chinese Patent Application No. 201880010249.7, along with an English translation.

\* cited by examiner

MULTIPLE TUBE BURNER FOR SYNTHESIZING POROUS MATERIAL AND APPARATUS FOR SYNTHESIZING POROUS MATERIAL

CROSS-REFERENCE TO RELATED APPLICATION(S)

This application is a continuation of International Application No. PCT/JP2018/001747, filed on Jan. 22, 2018 which claims the benefit of priority of the prior Japanese Patent Application No. 2017-030632, filed on Feb. 22, 2017, the entire contents of which are incorporated herein by reference.

BACKGROUND

The present disclosure relates to a multiple tube burner for synthesizing a porous material and an apparatus for synthesizing a porous material that includes the multiple tube burner for synthesizing a porous material.

In recent years, as to optical fiber glass preforms, a progress has been made in size enlargement, in order to improve productivity. The optical fiber glass preforms are manufactured, for example, by a well-known method, such as by a vapor phase axial deposition (VAD) method, a modified chemical vapor deposition (MCVD) method, or an outside vapor deposition (OVD) method.

For example, in the VAD method, glass microparticles that are formed by feeding flammable gas, auxiliary gas, and a glass raw material into a burner for synthesizing glass microparticles to cause flame hydrolysis reaction are deposited in a rotation axis direction of a rotating target (starting material), and a porous preform that is to serve as an optical fiber glass preform is thereby manufactured. Application of a multiple tube burner with three or more tubes made out of glass as a burner for synthesizing glass microparticles that is used when manufacturing this porous preform has generally been known (refer to Japanese Laid-open Patent Publication No. 2003-212560 (JP2003-212560 A)).

SUMMARY

According to an aspect of the present disclosure, a multiple tube burner for synthesizing a porous material is provided. The multiple tube burner includes three or more glass tubes arranged coaxially with one another, the glass tubes having a substantially circular cross section perpendicular to a longitudinal direction. Out of the three or more glass tubes, a first glass tube and a second glass tube that is arranged on an outer side of the first glass tube are connected with each other on a gas introducing side, and a thickness near a joint portion of the second glass tube connected with the first glass tube is thicker than a thickness of the second glass tube on the gas spouting side.

The above and other objectives, features, advantages and technical and industrial significance of this disclosure will be better understood by reading the following detailed description of presently preferred embodiments of the disclosure, when considered in connection with the accompanying drawings.

DETAILED DESCRIPTION

Hereinafter, one embodiment of the present disclosure is described with reference to the drawings. Note that the following embodiment is not intended to limit the present disclosure. Moreover, like reference symbols are given to the same or corresponding components throughout the drawings, and duplicated description is appropriately omitted. Furthermore, it is noted that the drawings are of schematic illustration, and a relationship among the respective components in dimension, and the like may differ from those in an actual situation. A part in which relationships in dimensions or ratios differ from one another among the drawings may also be included.

Figure 1:
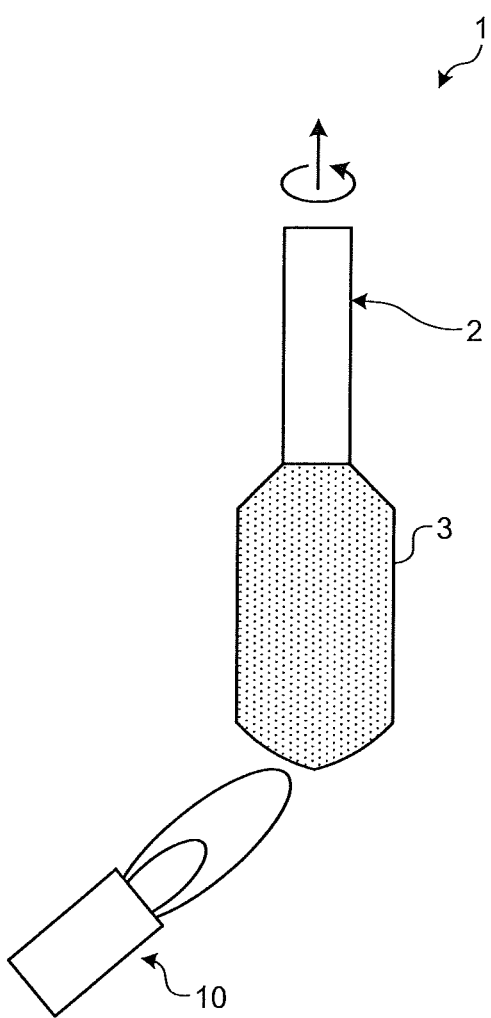
FIG. 1 is a schematic diagram illustrating a principal part of an apparatus for synthesizing a porous material according to one embodiment of the present disclosure.

FIG. 1 is a schematic diagram illustrating a principal part of an apparatus for synthesizing a porous material according to one embodiment of the present disclosure. As illustrated in FIG. 1, a vapor phase axial deposition (VAD) apparatus 1 serving as the apparatus for synthesizing a porous material includes a multiple tube burner 10 serving as a multiple tube burner for synthesizing a porous material. In the VAD apparatus 1, a porous preform 3 as the porous material in which glass microparticles, a main component of which is silicon oxide ($SiO_2$) are deposited, is synthesized at a lower end of a target rod 2. Specifically, the target rod 2 is pulled up while being rotated, and a flame from the multiple tube burner 10 is jetted onto the target rod 2, to synthesize the porous preform 3. The multiple tube burner 10 has a coaxial structure to deposit quartz glass microparticles on the target rod 2 as a starting material, or to perform densification.

To the multiple tube burner 10 in the VAD apparatus 1, a principal raw material gas of, for example, silicon tetrachloride ($SiCl_4$) or the like, a hydrogen ($H_2$) gas being a combustible gas, an oxygen ($O_2$) gas being a combustion promoting gas, and an argon (Ar) gas being a shielding gas (buffer gas), and the like are fed at the same time from a gas feeder unit (not shown). In deposition of quartz glass microparticles, a gas composed of a vaporized $SiCl_4$ gas, a $H_2$ gas, and an $O_2$ gas is supplied, being ignited into combustion in the multiple tube burner 10. $SiCl_4$ subjected to hydrolysis in flame becomes glass microparticles to be deposited in a rotation axis direction of the target rod 2, and the porous preform 3 is thus formed. This porous preform 3 is to be a part of a core portion and a cladding portion when turned into an optical fiber later.

Figure 2:
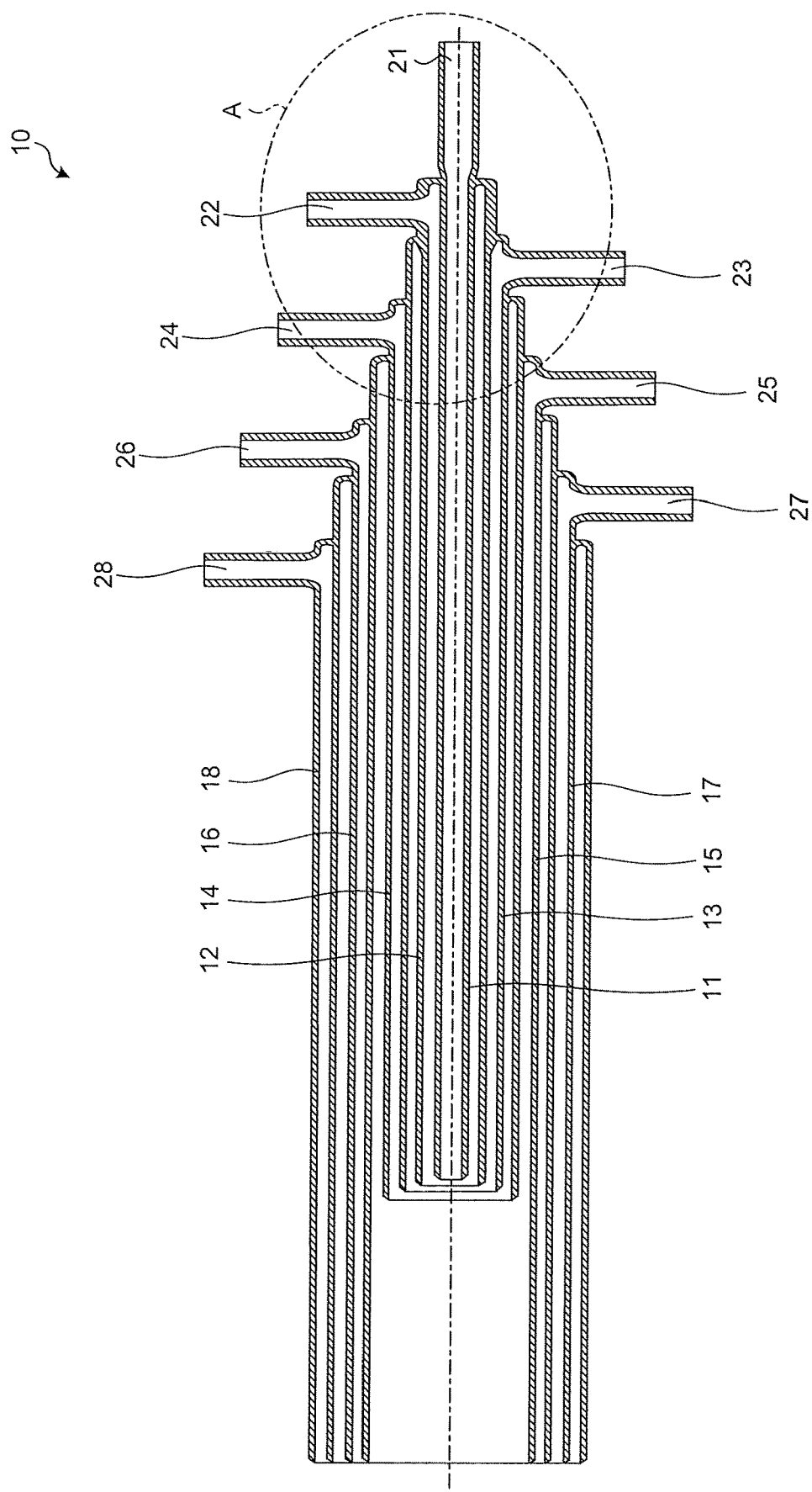
FIG. 2 is a side cross-section illustrating a multiple tube burner for synthesizing a porous material according to one embodiment of the present disclosure.
Figure 3:
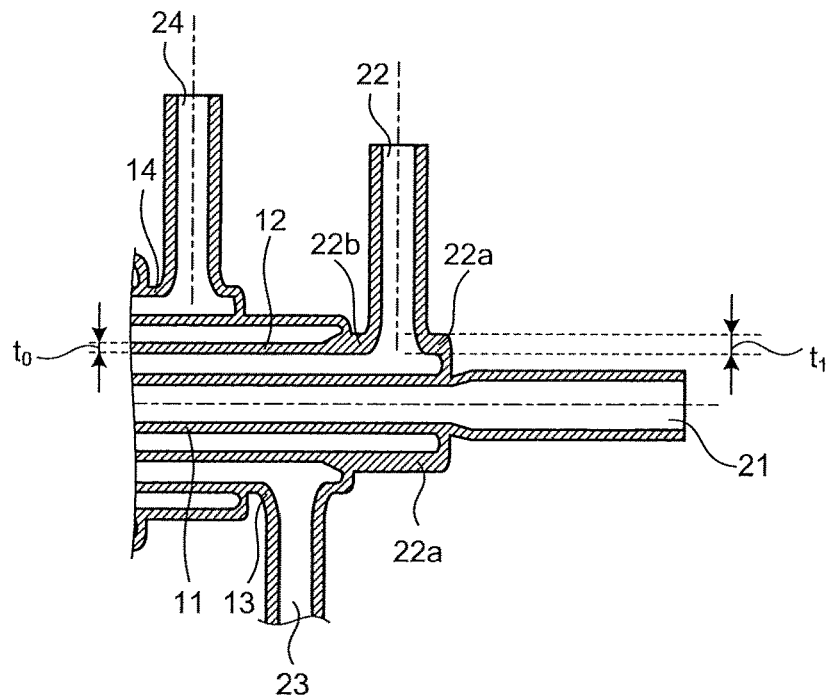
FIG. 3 is an enlarged cross-section in which a circled portion A in FIG. 2 is enlarged.
Figure 4:
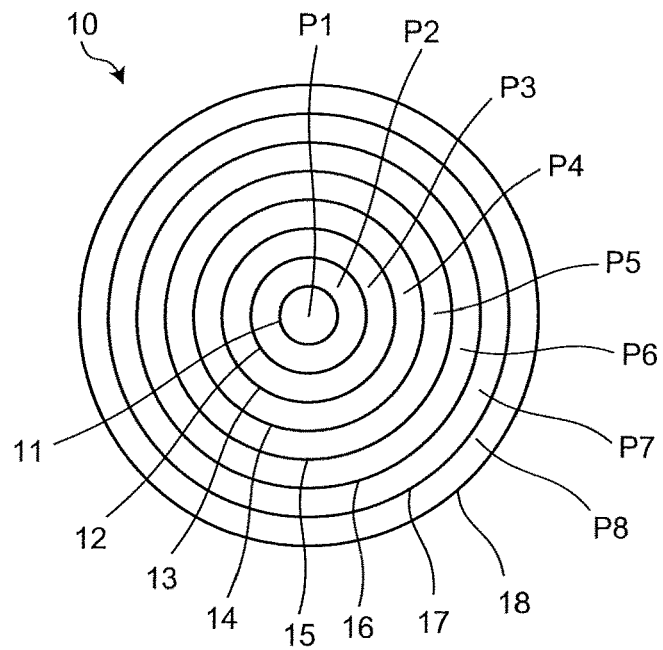
FIG. 4 is a schematic line diagram for explaining a structure on a cross-section of a multiple tube burner for synthesizing a porous material according to one embodiment of the present disclosure on a gas spouting side.

Next, the multiple tube burner 10 according to this embodiment is described. FIG. 2 is a side cross-section illustrating the multiple tube burner 10 according to one embodiment of the present disclosure, and FIG. 3 is an enlarged cross-section of a circled portion A in FIG. 2. FIG. 4 is a schematic line diagram schematically illustrating a structure on a cross-section of the multiple tube burner 10 on a gas spouting side.

As illustrated in FIG. 2 and FIG. 4, the multiple tube burner 10 according to one embodiment has an octuple tube structure in which eight glass tubes, each of which has a substantially circular shape on a cross section perpendicular to a longitudinal direction, are arranged coaxially with one another. In the multiple tube burner 10 having the octuple tube structure, a first glass tube 11 as a first glass tube is arranged in the center. On an outer periphery side of the first glass tube 11, a second glass tube 12 as a second glass tube is arranged coaxially with each other. Furthermore, on an outer periphery side of the second glass tube 12, a third glass tube 13 as a third glass tube is arranged coaxially with each other. Similarly, a fourth glass tube 14, a fifth glass tube 15, a sixth glass tube 16, a seventh glass tube 17, and an eight glass tube 18 are arranged sequentially toward an outer peripheral side, coaxially with one another.

As illustrated in FIG. 2 and FIG. 3, the first glass tube 11 is formed in one piece with a gas introducing tube 21 arranged on a gas introducing side. To the gas introducing tube 21, for example, a rubber tube is attached, and gas is fed from a gas feeder unit (both not shown). The fed gas flows inside the first glass tube 11, and is spouted out from the gas spouting side illustrated on a left side in the drawing.

In the second glass tube 12, a gas introducing branch tube 22 is arranged on the gas introducing side so as to communicate therewith. The gas introducing branch tube 22 is arranged such that a longitudinal direction thereof is substantially perpendicular to a longitudinal direction of the second glass tube 12. To the gas introducing branch tube 22, for example, a rubber tube is attached, and gas is fed from a gas feeder unit (both not shown). The fed gas flows through a gap in the second glass tube 12 with respect to the first glass tube 11, and is spouted out from the gas spouting side illustrated on the left side in the drawing.

Moreover, the second glass tube 12 is connected to an outer peripheral surface of the first glass tube 11 with a part of a joint portion 22a that is one end on the gas introducing side. In this one embodiment, a thickness $t_1$ of the joint portion 22a in the second glass tube 12 connected with the first glass tube 11 is thicker than a thickness $t_0$ of the second glass tube 12 on the gas spouting side (left side in FIG. 3) of $(t_0 < t_1)$.

According to findings of the present inventor, in the first glass tube 11 to the eighth glass tube 18, a relative position between the first glass tube 11 and the second glass tube 12 are most apt to be shifted by a stress applied to the gas introducing tube 21 and the gas introducing branch tube 22. As described later, because the first glass tube 11 is a glass tube from which the principal raw material gas of the porous preform 3 is spouted out, if the relative position between the first glass tube 11 and the second glass tube 12 are shifted, the porous preform 3 to be manufactured can be adversely affected. Therefore, it is preferable that the thickness $t_1$ near the joint portion 22a of the second glass tube 12 be thick enough to give rigidity enabling to keep the relative position between the first glass tube 11 and the second glass tube 12 invariant even when a stress is applied to the gas introducing tube 21 and the gas introducing branch tube 22. According to findings of the present inventor, it is preferable that the thickness $t_1$ near the joint portion 22a specifically be two times as thick or thicker than the thickness $t_0$ on the gas spouting side, and six times as thick as or thinner than the thickness $t_0$ ($2t_0 \leq t_1 \leq 6t_0$) to keep the rigidity.

The third glass tube 13 is connected to an outer peripheral surface of the second glass tube 12 with a part of a joint portion 22b that is one end on the gas introducing side. In this one embodiment, a thickness of the joint portion 22b in the second glass tube 12 connected with the third glass tube 13 is preferable to be substantially the same as the thickness $t_1$ of the joint portion 22a. That is, in the second glass tube 12, it is preferable that the thickness $t_1$ in a range from the joint portion 22a connected with the first glass tube 11 up to the joint portion 22b connected to the third glass tube 13 be thicker than the thickness $t_0$ on the gas spouting side.

Moreover, in the third glass tube 13, a gas introducing branch tube 23 is arranged on the gas introducing side so as to communicate therewith. The gas introducing branch tube 23 is arranged such that a longitudinal direction thereof is substantially perpendicular to a longitudinal direction of the third glass tube 13. To the gas introducing branch tube 23, for example, a rubber tube is attached, and gas is fed from a gas feeder unit (both not shown). The fed gas flows through a gap in the third glass tube 13 with respect to the second glass tube 12, and is spouted out from the gas spouting side illustrated on the left side in the drawing.

As illustrated in FIG. 2, the fourth glass tube 14 is connected to an outer peripheral surface of the third glass tube 13 at a portion of one end on the gas introducing side, and has a gas introducing branch tube 24 arranged such that a longitudinal direction thereof is substantially perpendicular to a longitudinal direction of the fourth glass tube 14. To the gas introducing branch tube 24, for example, a rubber tube is attached, and gas is fed from a gas feeder unit (both not shown). The fed gas flows through a gap in the fourth glass tube 14 with respect to the third glass tube 13, and is spouted out from the gas spouting side illustrated on the left side in the drawing.

The respective fifth glass tube 15, the sixth glass tube 16, the seventh glass tube 17, and the eighth glass tube 18 are also structured similarly to the fourth glass tube 14 described above. That is, the fifth glass tube 15 to the eighth glass tube 18 are connected to corresponding glass tubes arranged on one-layer inner side at one end on the gas introducing side, and has gas introducing branch tubes 25, 26, 27, 28 arranged so as to communicate therewith.

One end on the gas spouting side in the fifth glass tube 15 to the eighth glass tube 18 extends out by predetermined length relative to one end on the gas spouting side of the first glass tube 11 to the fourth glass tube 14. Thus, when flame is formed with gas spouted out from the multiple tube burner 10, the first glass tube 11 to the fourth glass tube 14 form flame on the inner side, and the fifth glass tube 15 to the eighth glass tube 18 form flame on the outer side.

As illustrated in FIG. 4, the first glass tube 11 arranged in the center forms a first port P1. The gap between the first glass tube 11 and the second glass tube 12 forms a second port P2. The gap between the second glass tube 12 and the third glass tube 13 forms a third port P3. Similarly, the gaps between a pair of adjacent glass tubes toward the outer side among the third glass tube 13 to the eighth glass tube 18 form a fourth port P4, a fifth port P5, a sixth port P6, a seventh port P7, and an eight port P8, respectively. That is, the gas introducing tube 21 and the gas introducing branch tubes 22 to 28 communicate with the first port P1 to the eighth port P8, respectively.

When flame is formed with the multiple tube burner 10, to the first port P1, the raw material gas ($SiCl_4$) is fed. Note that $H_2$ gas may be further fed as a flammable gas as necessary. To the second port P2, flammable gas of $H_2$ gas or a mixture gas of $H_2$ gas and the raw material gas is fed. To the third port P3, inert gas, such as Ar gas is fed as a shielding gas. To the fourth port P4, $O_2$ gas is fed as a combustion promoting gas. Similarly, Ar gas is fed to the fifth port P5, $H_2$ gas is fed to the sixth port P6, Ar gas is fed to the seventh port P7, and $O_2$ gas is fed to the eight port P8.

According to one embodiment of the present disclosure described above, the thickness $t_1$ of the joint portion 22a in the second glass tube 12 connected with the first glass tube 11 is thicker than the thickness $t_0$ of the second glass tube 12 on the gas spouting side, thereby enabling to improve the rigidity of the joint portion 22a. Therefore, even when a stress is applied to the gas introducing tube 21 and the gas introducing branch tube 22, the relative position between the first glass tube 11 and the second glass tube 12, which are most apt to be shifted, can be maintained on the gas spouting side. Thus, the relative positions among the first glass tube 11 to the eighth glass tube 18 on the gas spouting side can be maintained and an adverse influence on the porous preform 3 to be manufactured or manufacturing conditions thereof are thereby suppressed and, therefore, the porous preform 3 can be manufactured stably without variations. Furthermore, because the reproducibility of settings of the multiple tube burner 10 can be improved, swift start after a burner is changed becomes possible, and the producibility of the porous preform 3 can be improved.

As above, one embodiment of the present disclosure has been described specifically, but the present disclosure is not limited to the embodiment described above, and various kinds of modifications based on the technical thought of the present disclosure can be applied. For example, numeric values used in the embodiment described above are only examples, and numeric values different from these may be used as necessary.

Moreover, the apparatus for synthesizing a porous material has been described using the VAD apparatus as an example, it is not necessarily limited to the VAD apparatus. As the apparatus for synthesizing a porous material, other well-known synthesizing apparatuses (for example, an OVD apparatus, and the like) to which the multiple tube burner for synthesizing a porous material according to the present disclosure is applicable can be used.

In one embodiment described above, the example in which $SiCl_4$ is used as a glass raw material has been described, but $SiHCl_3$, $SiHCl_2$ or the like may be used as the glass material, and $GeCl_4$ may be further used as a Ge raw material as a dopant. Furthermore, as flammable gas, for example, a short-chain hydrocarbon, such as $CH_4$, $C_2H_6$, $C_3H_8$, $C_4H_{10}$, or the like may be used other than $H_2$.

In one embodiment described above, the multiple tube burner 10 has an octuple tube structure constituted of eight glass tubes, but the number of glass tubes is not limited to eight, and it can be a multiple tube structure constituted of any necessary number of glass tubes equal to or more than three.

In one embodiment described above, the thickness $t_1$ of the joint portion 22a in the second glass tube 12 connected with the first glass tube 11 is configured to be thicker than the thickness $t_0$ of the second glass tube 12 on the gas spouting side, but it may be configured such that a thickness of a joint portion in an n-th glass tube as the second glass tube connected with an (n−1)-th glass tube as the first glass (n is a positive integer equal to or larger than 3) is thicker than a thickness of the n-th glass tube on the gas spouting side.

According to a multiple tube burner for synthesizing a porous material and an apparatus for synthesizing a porous material according to the present disclosure, because a thickness of a joint portion of a second glass tube connected with a first glass tube is thicker than a thickness on a gas spouting side of the second glass tube, the rigidity of the joint portion of the second glass tube connected with the first glass tube can be increased. Therefore, even when a stress is applied to a portion on a gas introducing side, relative positions of the respective glass tubes on the gas spouting side are maintained, and an adverse influence on a porous preform to be manufactured and manufacturing conditions there of can be suppressed.

As described above, the present disclosure can be preferably used when manufacturing a porous preform to be a base material of an optical fiber glass preform.

What is claimed is:

1. A multiple tube burner for synthesizing a glass porous material, the multiple tube burner comprising:
    three or more glass tubes arranged coaxially with one another, the three or more glass tubes having a substantially circular cross section perpendicular to a longitudinal direction, wherein
    out of the three or more glass tubes, a first glass tube and a second glass tube that is arranged on an outer side of the first glass tube are connected with each other on a gas introducing side,
    a thickness near a first joint portion of the second glass tube connected with the first glass tube is thicker than a thickness of the second glass tube on a gas spouting side,
    a third glass tube is arranged on an outer side of the second glass tube coaxially with the second glass tube,
    the second glass tube and the third glass tube are connected with each other on the gas introducing side,
    a gas introducing branch tube is arranged between the first joint portion of the second glass tube connected with the first glass tube and a second joint portion of the second glass tube connected with the third glass tube, the gas introducing branch tube being arranged such that a longitudinal direction thereof is substantially perpendicular to a longitudinal direction of the second glass tube so as to communicate therewith,
    a thickness of a first portion of the second glass tube is greater than a thickness of a second portion of the second glass tube,
    the first portion of the second glass tube has a range from the first joint portion, where the second glass tube is connected with the first glass tube, to the second joint portion where the second glass tube is connected with the third glass tube,
    the second portion of the second glass tube is a portion on the gas spouting side with respect to the first portion, and
    a thickness near the first joint portion of the second glass tube connected with the first glass tube is two or more times as thick as the thickness of the second glass tube on the gas spouting side and six or less times as thick as the thickness of the second glass tube on the gas spouting side.

2. The multiple tube burner for synthesizing the glass porous material according to claim 1, wherein the first glass tube is arranged in a center of the second glass tube.

3. An apparatus for synthesizing a glass porous material comprising:
    the multiple tube burner according to claim 1; and
    a target rod.

4. The multiple tube burner for synthesizing the glass porous material according to claim 1, wherein a thickness of a joint portion in an n-th glass tube as the second glass tube connected with an (n−1)-th glass tube as the first glass tube (n is an integer greater than 2) is thicker than a thickness of the n-th glass tube on the gas spouting side.

* * * * *